United States Patent
Shi (10) Patent No.: US 10,281,687 B2
(45) Date of Patent: May 7, 2019

(54) VARIFOCAL OPTICAL SYSTEM

(71) Applicant: AAC Technologies Pte. Ltd., Singapore (SG)

(72) Inventor: Rongbao Shi, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 7 days.

(21) Appl. No.: 15/869,178

(22) Filed: Jan. 12, 2018

(65) Prior Publication Data

US 2018/0348485 A1    Dec. 6, 2018

(30) Foreign Application Priority Data

Jun. 1, 2017   (CN) .......................... 2017 1 0403327

(51) Int. Cl.
| | | |
|---|---|---|
| *G02B 9/60* | (2006.01) | |
| *G02B 13/00* | (2006.01) | |
| *G02B 27/00* | (2006.01) | |

(52) U.S. Cl.
CPC ....... *G02B 13/0045* (2013.01); *G02B 13/009* (2013.01); *G02B 27/0025* (2013.01)

(58) Field of Classification Search
CPC .............. G02B 13/0045; G02B 13/009; G02B 27/0025
See application file for complete search history.

(56) References Cited

FOREIGN PATENT DOCUMENTS

JP    2011-059498    *  9/2009    .......... G02B 15/167

* cited by examiner

*Primary Examiner* — Joseph P Martinez
(74) *Attorney, Agent, or Firm* — Na Xu; IPro, PLLC (57) ABSTRACT

The present disclosure relates to the field of imaging technologies and, particularly, relates to a varifocal optical system. The varifocal optical system includes a front fixing group, a triple prism, a zooming group, a compensating group, an objective lens group and an image plane which are successively arranged along an incident direction of light, and a total focal length of the varifocal optical system is a fixed value; the front fixing group includes a first lens; the zooming group includes a second lens; the compensating group includes a third lens and a fourth lens arranged along an optical path direction; the object lens group includes a fifth lens; and the first lens, the second lens, the third lens, the fourth lens and the fifth lens are all glass lenses. The present disclosure can satisfy the developing trend of miniaturization on electronic devices, and has a better imaging performance.

8 Claims, 7 Drawing Sheets

VARIFOCAL OPTICAL SYSTEM

TECHNICAL FIELD

The present disclosure relates to the field of imaging technologies and, particularly, relates to a varifocal optical system.

BACKGROUND

With the development of miniaturization of electronic devices such as cellphone, camera etc., imaging devices thereon are also being miniaturized. In varifocal optical systems of the prior art, a clear imaging is generally achieved by focal length switching through a zooming group and a compensating group. However, the structure of such a varifocal optical system is relatively complex, and the total length is relatively long, which cannot satisfy the developing trend of miniaturization of the electronic devices.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

L1—first lens;
TP—triple prism;
L2—second lens;
L3—third lens;
L4—fourth lens;
L5—fifth lens;
G1—glass plate;
W—image plane;
S—diaphragm.

The drawings herein are incorporated into the specification and form a part thereof, which show embodiments of the present disclosure, and are used to explain the principles of the present disclosure together with the specification.

DESCRIPTION OF EMBODIMENTS

The present disclosure will be described in further detail with reference to the following embodiments and the accompany drawings.

Figure 1:
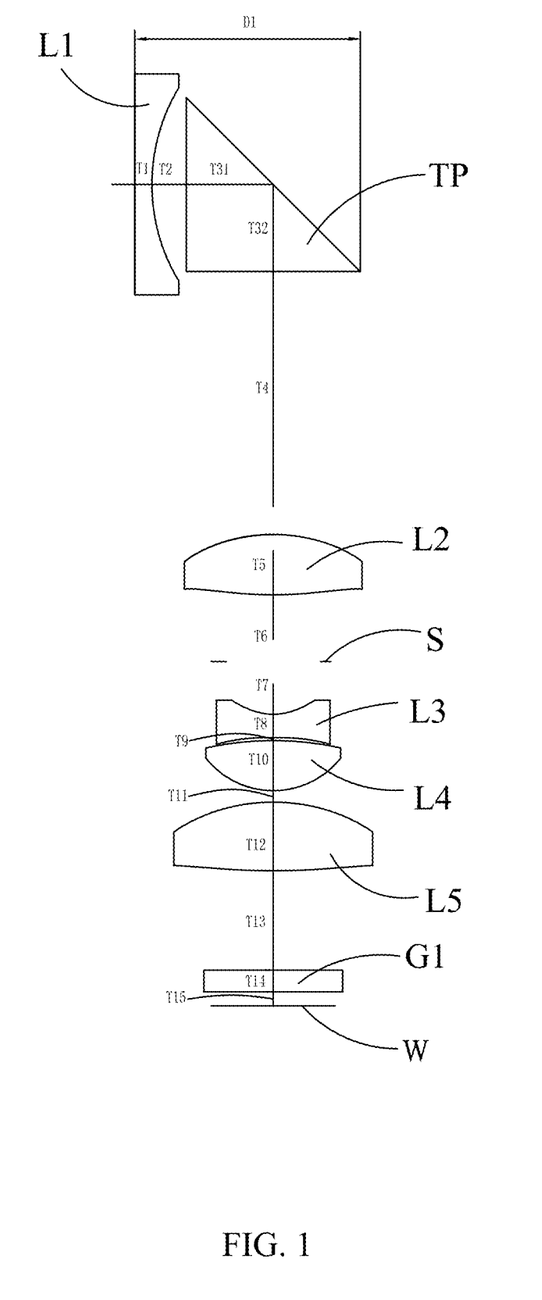
FIG. 1 is a structural schematic diagram of a varifocal optical system being in a short focus state in accordance with an exemplary embodiment of the present disclosure.
Figure 2:
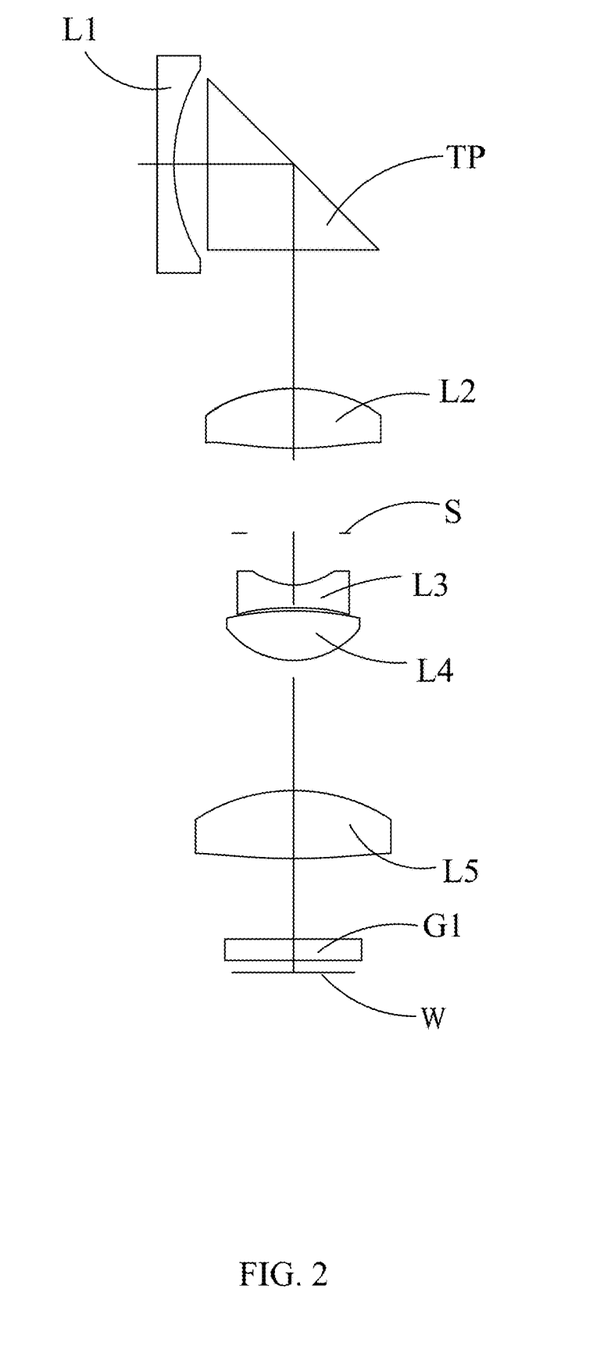
FIG. 2 is a structural schematic diagram of a varifocal optical system being in a medium focus state in accordance with an exemplary embodiment of the present disclosure.
Figure 3:
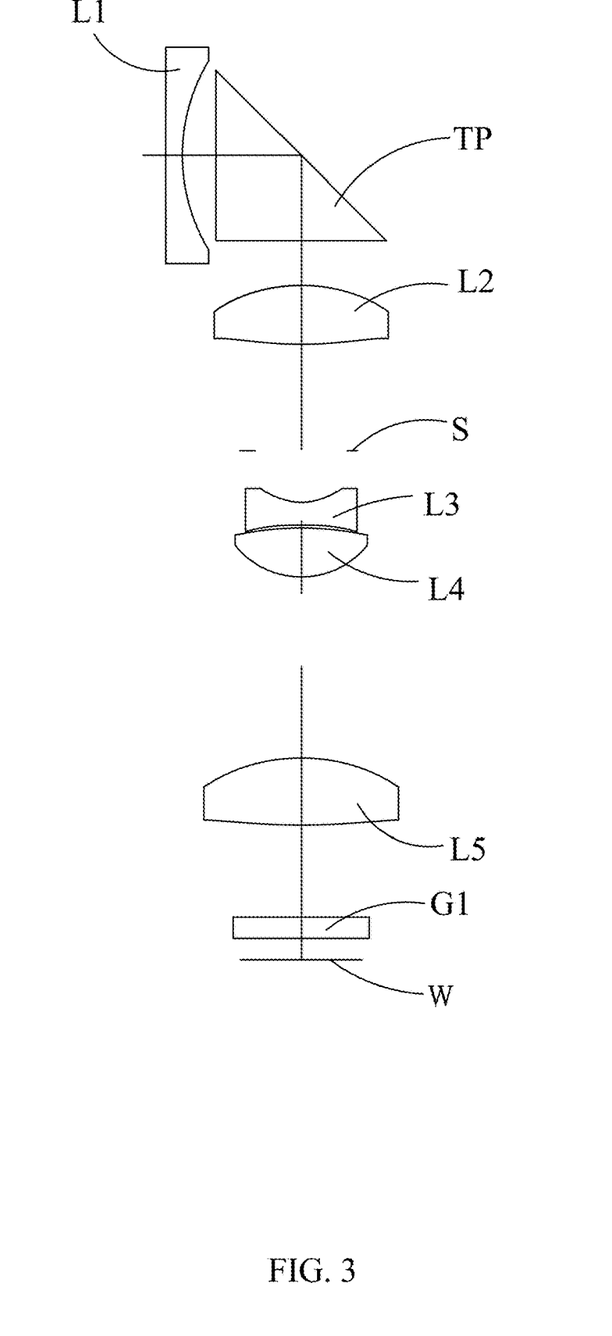
FIG. 3 is a structural schematic diagram of a varifocal optical system being in a long focus state in accordance with an exemplary embodiment of the present disclosure.

As shown from FIG. 1 to FIG. 3, the embodiments of the present disclosure provides a varifocal optical system, including: a front fixing group, a triple prism TP, a zooming group, a compensating group, an object lens group and an image plane W which are successively arranged along an incident direction of light. A total length of the varifocal optical system remains unchanged, and the varifocal optical system adopts a continuous zooming manner. Specifically, the front fixing group includes a first lens L1, the first lens L1 is a front-convex-and-back-concave lens, that is, an object-side surface of the first lens L1 is a convex surface, and an image-side surface is a concave surface. The triple prism TP is configured for refraction of optical path, which can be a right-angle triple prism, a right-angle edge of the triple prism TP is facing the first lens L1, and the other right-angle edge is facing the second lens L2. The zooming group and the compensating group can move between the triple prism TP and the object lens group along an optical path direction, so as to achieve continuous switching of the focal length. The zooming group includes a second lens L2, the second lens L2 is a double-convex lens. The compensating group includes a third lens L3 and a fourth lens L4 which are arranged along the optical path direction, the third lens L3 is a double-concave lens, the fourth lens L4 is a double-convex lens. The object lens group can move with respect to the image plane W along the optical path direction to achieve fine adjustment of the object lens group, so as to be used for focusing in scenarios at different distances. The object lens group includes a fifth lens L5, the fifth lens L5 is a double-convex lens. It should be noted that, the above 'front' refers to a side along the optical path direction close to the incident end, the 'back' refers to a side along the optical path direction away from the incident end. The first lens L1, the second lens L2, the third lens L3, the fourth lens L4 and the fifth lens L5 are all glass lenses.

In the above-mentioned structure, through adding the triple prism TP, the optical path can be refracted to reduce the total length of the optical system, so as to be adapted to the developing trend of miniaturization on electronic device. The cooperation of the zooming group and the compensating group allows the object to be clearly imaged clearly from a limited distance to an infinite distance.

Further, the first lens L1 and the third lens L3 have negative focal power, the second lens L2, the fourth lens L4 and the fifth lens L5 have positive focal power.

Among an object-side surface and an image-side surface of the second lens L2, an object-side surface and an image-side surface of the third lens L3, an object-side surface and an image-side surface of the fifth lens L5, at least one of them is an aspheric surface, and the rest are spherical surfaces. Optionally, the object-side surface and the image-side surface of the first lens L1, the object-side surface and the image-side surface of the fourth lens L4 are all spherical surfaces; and the object-side surface and the image-side surface of the second lens L2, the object-side surface and the image-side surface of the third lens L3, the object-side surface and the image-side surface of the fifth lens L5 are all aspheric surfaces. That is to say, all points on the object-side surface and the image-side surface of the first lens L1, and all points on the object-side surface and the image-side surface of the fourth lens L4 satisfy a spherical equation. All points on the object-side surface and the image-side surface of the second lens L2, all points on the object-side surface and the image-side surface of the third lens L3, and all points on the object-side surface and the image-side surface of the fifth lens L5 satisfy an aspheric equation. The arrangement of the spherical surfaces and the aspheric surfaces can better correct aberration, so as to improve imaging quality.

In the above-mentioned embodiments, the varifocal optical system satisfies the following conditional expression, $$7.5 \text{ mm} \leq D1 \leq 12.5 \text{ mm}; \tag{1}$$

D1 is an axial distance from the object-side surface of the first lens L1 to an end of the triple prism TP away from the first lens L1, as shown in FIG. 1.

Conditional expression (1) defines the axial distance between the first lens L1 and the triple prism TP, for example D1=7.5 mm, 8.0 mm, 9 mm, 9.8 mm, 9.85 mm, 10 mm, 11 mm, 12.5 mm etc., which decreases the size of the varifocal optical system in the incident direction of light as much as possible while guaranteeing the imaging quality, so as to be better adapted to the development trend of miniaturization on the electronic device.

The varifocal optical system in the above-mentioned embodiments satisfies the following conditional expressions, $$D1/\Sigma Ti < 1.1; \tag{2}$$

$$\Sigma Ti = T1 + T5 + T8 + T10 + T12; \tag{3}$$

the D1 is the axial distance from the object-side surface of the first lens L1 to an end of the triple prism TP away from the first lens L1, as shown in FIG. 1;

$\Sigma Ti$ is a sum of central thicknesses of the first lens L1, the second lens L2, the third lens L3, the fourth lens L4 and the fifth lens L5;

T1 is a central thickness of the first lens L1;
T5 is central thickness of the second lens L2;
T8 is central thickness of the third lens L3;
T10 is central thickness of the fourth lens L4;
T12 is central thickness of the fifth lens L5.

The above-mentioned conditional expressions (2), (3) define the ratio of the radial dimension to the length of the optical system, so as to further reduce the volume of the entire optical system, and be adapted to the development trend of miniaturization on the electronic device.

In the above-mentioned embodiments, the varifocal optical system satisfies the following conditional expressions, $$1.55 \leq n1 \leq 1.65, \tag{4}$$

$$1.75 \leq nTP \leq 1.85, \tag{5}$$

$$1.55 \leq n2 \leq 1.61, \tag{6}$$

$$1.7 \leq n3 \leq 1.75, \tag{7}$$

$$1.53 \leq n4 \leq 1.63, \tag{8}$$

$$1.55 \leq n5 \leq 1.61, \tag{9}$$

nTP is a refractive index of the triple prism;
n1 is a refractive index of the first lens L1;
n2 is a refractive index of the second lens L2;
n3 is a refractive index of the third lens L3;
n4 is a refractive index of the fourth lens L4;
n5 is a refractive index of the fifth lens L5.

In the above-mentioned conditional expressions, conditional expression (5) defines the refractive index of the triple prism TP, for example nTP=1.75, 1.8, 1.8042, 1.85 etc., in the range defined by conditional expression (5), it is advantageous to increase the angle of incidence, and increase imaging range of the optical system. It is preferred that the nTP approaches an upper limit. If the nTP is below a lower limit, it is disadvantageous to increase the angle of incidence, result in a reduced imaging range; if the nTP is beyond the upper limit, the material selection will be limited, leading to cost increase.

Conditional expressions (4), (6), (7), (8), (9) respectively define the refractive indexes of the first lens L1, the second lens L2, the third lens L3, the fourth lens L4 and the fifth lens L5, for example n1=1.55, 1.58, 1.6, 1.638542, 1.65 etc., n2=1.55, 1.58, 1.6, 1.61 etc., n3=1.7, 1.72, 1.74, 1.75 etc., n4=1.53, 1.56, 1.59, 1.6 etc., n5=1.55, 1.57, 1.6, 1.61. In the ranges defined in the above-mentioned conditional expressions, it is advantage to correct chromatic aberration, and thus improve imaging quality. If refractive indexes are below the lower limit or beyond the upper limit defined in the conditional expressions (4), (6), (7), (8), (9), it is disadvantageous to correct chromatic aberration, and material selection will be limited, leading to cost increase.

The varifocal optical system in the above-mentioned embodiments satisfies the following conditional expressions, $$-3.0 \leq f1/fs \leq -2.1; \tag{10}$$

$$1.5 \leq f2/fs \leq 2.0; \tag{11}$$

$$-1.0 \leq f3/fs \leq -0.3; \tag{12}$$

$$0.6 \leq f4/fs \leq 1.5; \tag{13}$$

$$1.75 \leq f5/fs \leq 2.45; \tag{14}$$

f1 is a focal length of the first lens;
f2 is a focal length of the second lens;
f3 is a focal length of the third lens;
f4 is a focal length of the fourth lens;
f5 is a focal length of the fifth lens;
fs is a focal length of the varifocal optical system in a short focus state.

Conditional expressions (10)-(14) define the ratio of the focal length of each lens to the focal length of the varifocal optical system in the short focus state, for example f1/fs=−3.0, −2.8, −2.634, −2.5, −2.2, −2.1 etc., f2/fs=1.5, 1.6, 1.7317, 1.85, 1.9, 2.0 etc., f3/fs=−1.0, −0.9, −0.6232, −0.6, −0.5, −0.35, −0.3 etc., f4/fs=0.6, 0.65, 0.8, 0.9, 1.171, 1.2, 1.5 etc., f5/fs=1.75, 1.8, 2.0, 2.1, 2.1574, 2.25, 2.45 etc., in the ranges defined in the conditional expressions (10)-(14), the allocation of focal power of each lens is reasonable, which can effectively control the curvature field of the system.

The varifocal optical system in the above-mentioned embodiments satisfies the following conditional expression, $$T4 > 2 \text{ mm}; \tag{15}$$

T4 is an axial distance from the image-side surface of the triple prism TP to the object-side surface of the second lens L2, when the system is in long focal length.

Conditional expression (15) defines the axial distance from the image-side surface of the triple prism TP to the object-side surface of the second lens L2, such as T4=2.0 mm, 2.34 mm, 3 mm etc., so as to guarantee all incident light enters into the second lens L2 after being refracted by the triple prism TP, thereby guaranteeing imaging quality.

Generally, the varifocal optical system also includes a diaphragm S, along the optical path direction, the diaphragm S is located between the second lens L2 and the third lens L3, the varifocal optical system satisfies the following conditional expressions, $$T6 > 1.5 \text{ mm}; \quad (16)$$

$$T7 > 1.5 \text{ mm}; \quad (17)$$

T6 is an axial distance from the image-side surface of the second lens L2 to the diaphragm S;

T7 is an axial distance from the diaphragm S to the object-side surface of the third lens L3.

Conditional expressions (16), (17) define the distance between the diaphragm S and the second lens L2, and the distance between the diaphragm S and the third lens L3. For example T6, T7 can respectively be selected from the following values: 1.55 mm, 1.6 mm, 1.9 mm, 2.2 mm, 2.34 mm, 2.5 mm etc., in the range defined by conditional expressions (16), (17), it is guaranteed that enough light can pass through, so as to guarantee intensity of the light, and thereby improving imaging quality.

Generally, the varifocal optical system also includes a glass plate G1, along the optical path direction, the glass plate G1 is arranged between the fifth lens L5 and the image plane W.

The following parameters in accordance with an exemplary embodiment will illustrate the varifocal optical system provided in the present disclosure. Table 1 lists parameters of the first lens L1, the second lens L2, the third lends L3, the fourth lens L4, the fifth lens L5, the triple prism TP and the diaphragm S in the present embodiment. Table 2 lists aspheric coefficients of each aspheric lens in the present embodiment. Table 3 lists various parameters of the present embodiment in a short focus state, a medium focus state, and a long focus state. Table 4 lists specific parameters of each conditional expression in the present embodiment of the present disclosure. The parameters in the tables are defined as follows:

R11: curvature radius of object-side surface of the first lens L1;
R12: curvature radius of image-side surface of the first lens L1;
R21: curvature radius of object-side surface of the second lens L2;
R22: curvature radius of image-side surface of the second lens L2;
R31: curvature radius of object-side surface of the third lens L3;
R32: curvature radius of image-side surface of the third lens L3;
R41: curvature radius of object-side surface of the fourth lens L4;
R42: curvature radius of image-side surface of the fourth lens L4;
R51: curvature radius of object-side surface of the fifth lens L5;
R52: curvature radius of image-side surface of the fifth lens L5;
n1: refractive index of the first lens L1;
nTP: refractive index of the triple prism TP;
n2: refractive index of the second lens L2;
n3: refractive index of the third lens L3:
n4: refractive index of the fourth lens L4:
n5: refractive index of the fifth lens L5:
n6: refractive index of the glass plate G1;
V1: chromatic dispersion coefficient of the first lens L1;
VTP: chromatic dispersion coefficient of the triple prism;
V2: chromatic dispersion coefficient of the second lens L2;
V3: chromatic dispersion coefficient of the third lens L3;
V4: chromatic dispersion coefficient of the fourth lens L4;
V5: chromatic dispersion coefficient of the fifth lens L5;
V6: chromatic dispersion coefficient of the glass plate G1;
T1: central thickness of the first lens L1;
T2: axial distance from the image-side surface of the first lens L1 to the object-side surface of the triple prism TP;
T31: horizontal central thickness of the triple prism TP;
T32: vertical central thickness of the triple prism TP;
T4: axial distance from the image-side surface of the triple prism TP to the object-side surface of the second lens L2;
T5: central thickness of the second lens L2;
T6: axial distance from the image-side surface of the second lens L2 to the diaphragm S;
T7: axial distance from the diaphragm S to the object-side surface of the third lens L3;
T8: central thickness of the third lens L3;
T9: axial distance from the image-side surface of the third lens L3 to the object-side surface of the fourth lens L4;
T10: central thickness of the fourth lens L4;
T11: axial distance from the image-side surface of the fourth lens L4 to the object-side surface of the fifth lens L5;
T12: central thickness of the fifth lens L5;
T13: axial distance from the image-side surface of the fifth lens L5 to the object-side surface of the glass plate G1;
T14: central thickness of the first glass plate G1;
T15: axial distance from the image surface of the first glass plate G1 to the image plane W;
f: focal length of the varifocal optical system;
fs: focal length of the varifocal optical system in a short focus state;
f1: focal length of the first lens L1:
f2: focal length of the second lens L2;
f3: focal length of the third lens L3;
f4: focal length of the fourth lens L4;
f5: focal length of the fifth lens L5;
FOV: field of view;
D: effective aperture;
H: horizontal field of view;
V: vertical field of view;
ENPD: entrance pupil diameter;
D1: axial distance from the object-side surface of the first lens L1 to an end of the triple prism TP away from the first lens L1;

$$y = \frac{\left(\frac{x^2}{R}\right)}{\left[1 + \left\{1 - (k+1)\left(\frac{x^2}{R^2}\right)\right\}^{\frac{1}{2}}\right]} + A4x^4 + A6x^6 + A8x^8 + A10x^{10} + A12x^{12} + A14x^{14} + A16x^{16} \quad (18)$$

For ease of convenience, the aspheric surface of each lens surface satisfies the aspheric equation of conditional expression (18), in the equation, R is axial curvature radius, k is cone coefficient, A4, A6, A8, A10, A12, A14, A16 are aspheric surface coefficients.

TABLE 1

|    |     | Curvature radius (mm) |     | Thickness or distance (mm) |     | Refractive index |     | Chromatic dispersion coefficient |    | Focal length (mm) |
|----|-----|------|-----|--------|-----|-------|-----|--------|----|----------|
| L1 | R11 | 1963.98 | T1 | 0.75 | n1 | 1.639 | V1 | 55.450 | f1 | −12.8154 |
|    | R12 | 8.182949 | T2 | 1.5 |    |       |    |        |    |          |
| TP |     |      | T31 | 3.8 | nTP | 1.804 | VTP | 46.500 |    |          |
|    |     |      | T32 | 3.8 |    |       |    |        |    |          |
|    |     |      | T4  | 6.169 |   |       |    |        |    |          |
| L2 | R21 | −7.36779 | T5 | 2.636 | n2 | 1.589 | V2 | 61.150 | f2 | 8.973478 |
|    | R22 | 16.45285 | T6 | 3.784 |   |       |    |        |    |          |
| S  |     | ∞    | T7  | 2.307 |   |       |    |        |    |          |
| L3 | R31 | 2.368576 | T8 | 1.018 | n3 | 1.723 | V3 | 29.23 | f3 | −3.0495 |
|    | R32 | −42.1329 | T9 | 0.13 |   |       |    |        |    |          |
| L4 | R41 | −13.7359 | T10 | 2.188 | n4 | 1.54 | V4 | 59.709 | f4 | 5.68504 |
|    | R42 | 3.75106 | T11 | 5.292 |   |       |    |        |    |          |
| L5 | R51 | −8.10201 | T12 | 3 | n5 | 1.589 | V5 | 61.150 | f5 | 11.11428 |
|    | R52 | 30.04504 | T13 | 4 |   |       |    |        |    |          |
| G1 |     | ∞    | T14 | 0.95 | n6 | 1.517 | V6 | 64.167 |   |          |
|    |     | ∞    | T15 | 0.532 |   |      |    |        |    |          |

It should be noted that, in Table 1, the T4, T6, T11, T15 are distance values in medium focus state; when in long focus state, T4=2.001, T6=4.738, T11=8.071, T15=0.96; when in a short focus state, T4=11.498, T6=2.915, T11=0.5, T15=0.963.

TABLE 2

|     | Cone coefficient | Aspheric surface coefficient | | | | |
|-----|------|-----|-----|-----|-----|-----|
|     | k    | A4  | A6  | A8  | A10 | A12 |
| R21 | 3.9092E−01 | −2.3329E−05 | 8.1586E−06 | −1.7676E−06 | 1.3791E−07 | −6.8444E−09 |
| R22 | −1.4254E+01 | −2.3923E−04 | −3.6025E−07 | −1.4503E−06 | 7.8689E−08 | −6.4198E−09 |
| R31 | −2.9954E−01 | −2.4812E−02 | 5.1238E−03 | −8.6570E−04 | 6.3320E−05 | −9.2711E−13 |
| R32 | 1.7817E+01 | −1.6517E−02 | 3.5705E−03 | −4.8942E−04 | 4.0942E−05 | −1.5612E−06 |
| R51 | 7.0600E−01 | 8.9685E−05 | 7.8608E−06 | −2.6514E−07 | | |
| R52 | 3.3661E+01 | −2.6308E−04 | 2.0127E−06 | −8.1851E−07 | | |

TABLE 3

|                |          | Short focus state | Medium focus state | Long focus state |
|----------------|----------|-------|-------|-------|
| Focal length f (mm) |     | 4.91  | 7.365 | 9.82  |
| Field of view  | FOV(degree) | 64 | 46 | 30 |
|                | D (mm)   | 60    | 42    | 28    |
|                | H (degree) | 48  | 33.4  | 22.4  |
|                | V (degree) | 36  | 25.2  | 16.8  |
|                | FOV/2 (degree) | 32 | 23 | 15 |
|                | D/2 (mm) | 30    | 21    | 14    |
|                | H/2 (degree) | 24 | 16.7 | 11.2 |
|                | V/2 (degree) | 18 | 12.6 | 8.4 |
| Main angle of incidence (degree) | 0.1H | 0.36 | 0.232 | 0.456 |
|                | 0.2H | 0.717 | 0.475 | 0.922 |
|                | 0.3H | 1.068 | 0.741 | 1.411 |
|                | 0.4H | 1.409 | 1.043 | 1.933 |
|                | 0.5H | 1.735 | 1.398 | 2.505 |
|                | 0.6H | 2.038 | 1.826 | 3.141 |
|                | 0.7H | 2.311 | 2.349 | 3.863 |
|                | 0.8H | 0.766 | 4.196 | 5.137 |
|                | 0.9H | 1.028 | 7.207 | 9.487 |
|                | 1H   | 3.1   | 10.731 | 14.537 |
| ENPD (mm)      |      | 1.69246 | 2.344 | 3.86782 |
| Distortion     | 0.1H | −0.080 | −0.033 | −0.022 |
|                | 0.2H | −0.321 | −0.134 | −0.087 |
|                | 0.3H | −0.729 | −0.307 | −0.020 |
|                | 0.4H | −1.308 | −0.557 | −0.366 |
|                | 0.5H | −2.069 | −0.891 | −0.590 |
|                | 0.6H | −3.022 | −1.317 | −0.878 |
|                | 0.7H | −4.177 | −1.839 | −1.235 |
|                | 0.8H | −5.539 | −2.354 | −1.623 |
|                | 0.9H | −7.131 | −2.900 | −1.857 |
|                | 1H   | −8.979 | −3.590 | −2.065 |

TABLE 4

|       | First embodiment | Note |
|-------|-------|------|
| D1 (mm) | 9.85 | Conditional expression (1) |
| ΣTi   | 9.592 | Conditional expression (3) |
| D1/ΣTi | 1.03 | Conditional expression (2) |
| n1    | 1.639 | Conditional expression (4) |
| nTP   | 1.804 | Conditional expression (5) |
| n2    | 1.589 | Conditional expression (6) |
| n3    | 1.723 | Conditional expression (7) |
| n4    | 1.54  | Conditional expression (8) |
| n5    | 1.589 | Conditional expression (9) |
| f1/f  | −2.61 | Conditional expression (10) |
| f2/f  | 1.83  | Conditional expression (11) |
| f3/f  | −0.62 | Conditional expression (12) |
| f4/f  | 1.16  | Conditional expression (13) |
| f5/f  | 2.26  | Conditional expression (14) |
| T4    | 11.498 | Conditional expression (15) |
| T6    | 2.915 | Conditional expression (16) |
| T7    | 2.307 | Conditional expression (17) |

It should be noted that, the height of the image of the present embodiment by adopting parameters in Tables 1-3 is 2.45 mm.

Figure 4:
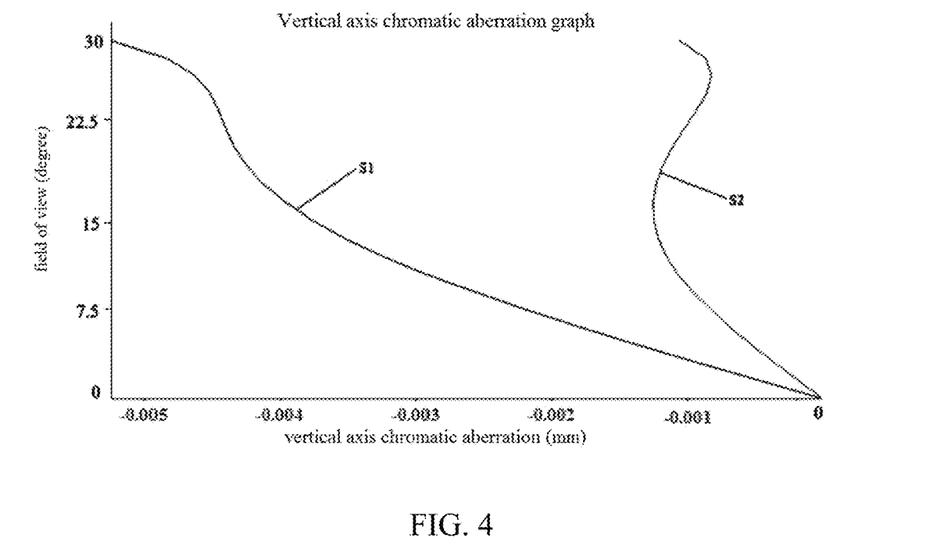
FIG. 4 is a graph showing vertical axis chromatic aberration of a varifocal optical system being in a short focus state in accordance with an exemplary embodiment of the present disclosure.
Figure 5:
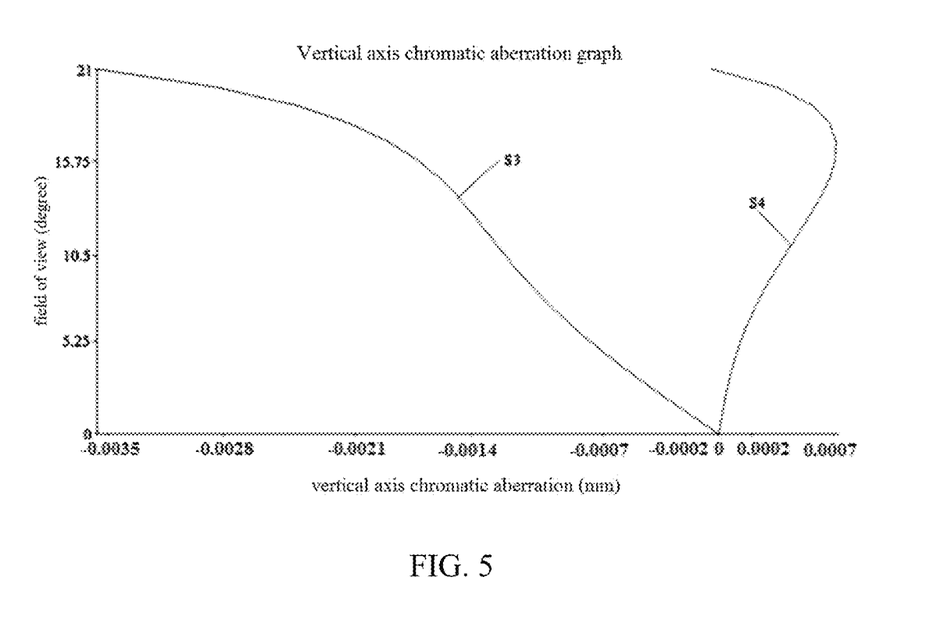
FIG. 5 is a graph showing vertical axis chromatic aberration of a varifocal optical system being in a medium focus state in accordance with an exemplary embodiment of the present disclosure.
Figure 6:
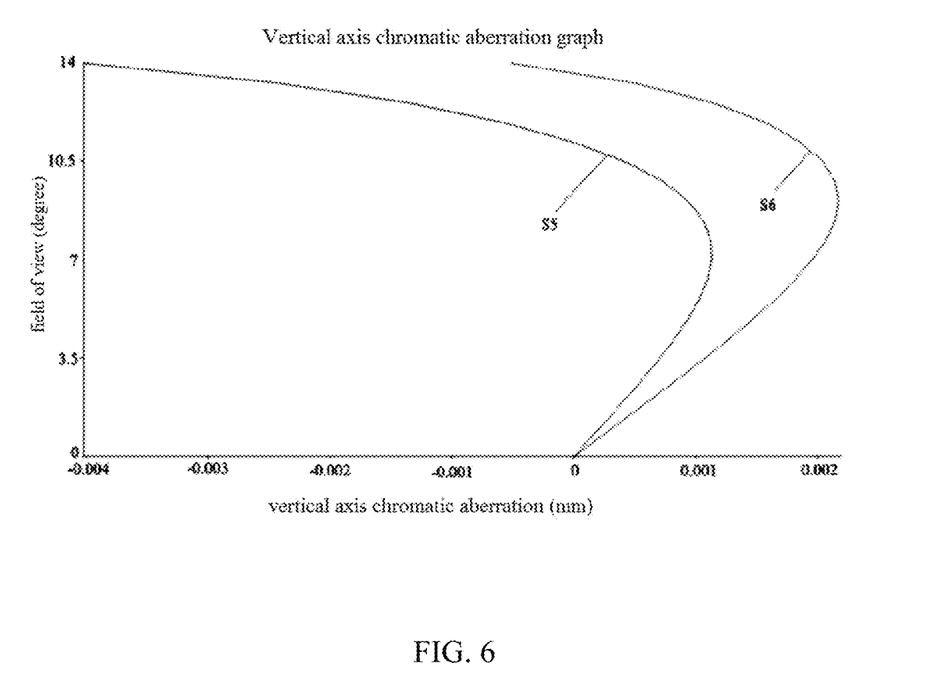
FIG. 6 is a graph showing vertical axis chromatic aberration of a varifocal optical system being in a long focus state in accordance with an exemplary embodiment of the present disclosure.
Figure 7:
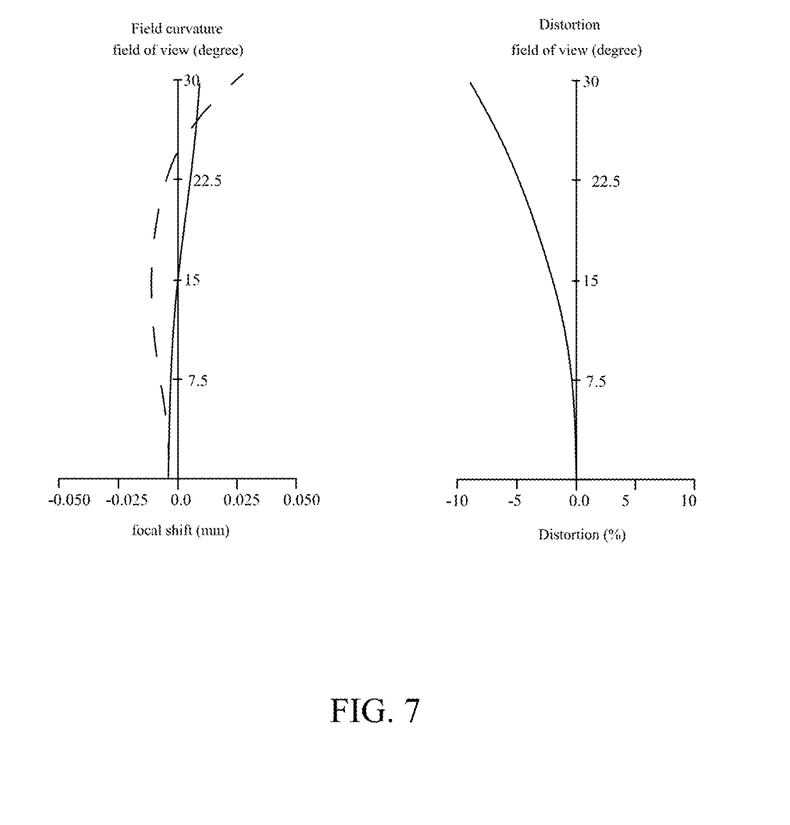
FIG. 7 is a graph showing field curvature and distortion of a varifocal optical system being in a short focus state in accordance with an exemplary embodiment of the present disclosure.
Figure 8:
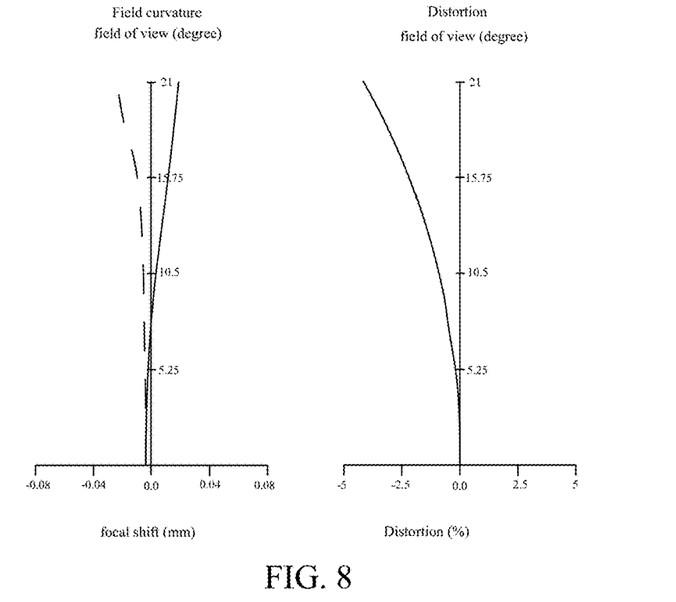
FIG. 8 is a graph showing field curvature and distortion of a varifocal optical system being in a medium focus state in accordance with an exemplary embodiment of the present disclosure.
Figure 9:
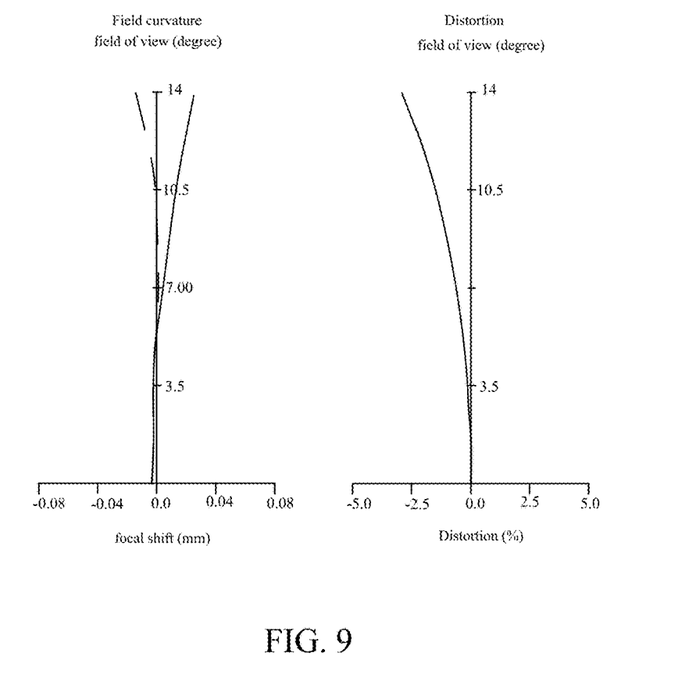
FIG. 9 is a graph showing field curvature and distortion of a varifocal optical system being in a long focus state in accordance with an exemplary embodiment of the present disclosure.

FIG. 1 shows a structural schematic diagram of the embodiment adopting the parameters in Tables 1-3 being in a short focus state, FIG. 4 shows vertical axis chromatic aberration in a short focus state, FIG. 7 shows the field curvature and distortion in a short focus state; FIG. 2 is a structural schematic diagram of the embodiment adopting the parameters in Tables 1-3 in a medium focus state, FIG. 5 shows vertical axis chromatic aberration in a medium focus state, FIG. 8 shows the field curvature and distortion in a medium focus state; FIG. 3 is a structural schematic diagram of the embodiment adopting the parameters in Tables 1-3 in a long focus state, FIG. 6 shows vertical axis chromatic aberration in a long focus state, FIG. 9 shows the field curvature and distortion in a long focus state. Curves S1, S3, S5 are the vertical axial chromatic aberration of the short wave length with respect to the long wave length. Curves S2, S4, S6 are the vertical axial chromatic aberration of the short wave length corresponding to the main wave length. It can be seen from FIG. 1 to FIG. 3, during zooming from short focus to medium focus, and to long focus, the zooming group (i.e., second lens L2) is gradually away from the triple prism TP, the compensating group (i.e., the third lens L3) is gradually close to the image plane W; It can be seen from FIG. 4 to FIG. 9, adopting the embodiments provided by the present disclosure can obtain better imaging quality.

The above are just the preferred embodiments of the present disclosure, which will not limit the present disclosure. For those skilled in the art, the present disclosure can have various modifications and variations. Any modifications, equivalent replacements and improvements made within the spirits and principles of the present disclosure shall all fall in the protection scope of the present disclosure.

What is claimed is:

1. A varifocal optical system, comprising:
a front fixing group, wherein the front fixing group comprises a first lens, and the first lens is a front-convex-and-back-concave lens;
a triple prism, configured to refract an optical path;
a zooming group, wherein the zooming group comprises a second lens, and the second lens is a double-convex lens;
a compensating group, wherein the compensating group comprises a third lens and a fourth lens which are arranged along an optical path direction, the third lens is a double-concave lens, and the fourth lens is a double-convex lens;
an object lens group, wherein the object lens group comprises a fifth lens, and the fifth lens is a double-convex lens; and
an image plane;
wherein the front fixing group, the triple prism, the zooming group, the compensating group, the object lens group and the image plane are successively arranged along an incident direction of light; the zooming group and the compensating group are movable between the triple prism and the object lens group, so as to continuously switch a focal length; and the object lens group is movable in the optical path direction with respect to the image plane, so as to focus in scenarios at different distances;
wherein the first lens, the second lens, the third lens, the fourth lens and the fifth lens are glass lenses; and
wherein a total optical length of the varifocal optical system is a fixed value.

2. The varifocal optical system as described in claim 1, wherein the varifocal optical system satisfies following conditional expression:

$$7.5 \text{ mm} \leq D1 \leq 12.5 \text{ mm};$$

wherein D1 is an axial distance from an object-side surface of the first lens to an end of the triple prism away from the first lens.

3. The varifocal optical system as described in claim 1, wherein the varifocal optical system satisfies following conditional expressions:

$$D1/\Sigma Ti < 1.1; \text{ and}$$

$$\Sigma Ti = T1 + T5 + T8 + T10 + T12;$$

wherein,
D1 is an axial distance from an object-side surface of the first lens to an end of the triple prism away from the first lens;
$\Sigma Ti$ is a sum of central thicknesses of the first lens, the second lens, the third lens, the fourth lens and the fifth lens;
T1 is a central thickness of the first lens;
T5 is a central thickness of the second lens;
T8 is a central thickness of the third lens;
T10 is a central thickness of the fourth lens; and
T12 is a central thickness of the fifth lens.

4. The varifocal optical system as described in claim 1, wherein the varifocal optical system satisfies following conditional expressions:

$$1.55 \leq n1 \leq 1.65;$$

$$1.75 \leq n\text{TP} \leq 1.85;$$

$$1.55 \leq n2 \leq 1.61;$$

$$1.7 \leq n3 \leq 1.75;$$

$$1.53 \leq n4 \leq 1.63; \text{ and}$$

$$1.55 \leq n5 \leq 1.61;$$

wherein,
nTP is a refractive index of the triple prism;
n1 is a refractive index of the first lens;
n2 is a refractive index of the second lens;
n3 is a refractive index of the third lens;
n4 is a refractive index of the fourth lens; and
n5 is a refractive index of the fifth lens.

5. The varifocal optical system as described in claim 1, wherein the varifocal optical system satisfies following conditional expressions:

$$-3.0 \leq f1/fs \leq -2.1;$$

$$1.5 \leq f2/fs \leq 2.0;$$

$$-1.0 \leq f3/fs \leq -0.3;$$

$$0.6 \leq f4/fs \leq 1.5; \text{ and}$$

$$1.75 \leq f5/fs \leq 2.45;$$

wherein,
f1 is a focal length of the first lens;
f2 is a focal length of the second lens;
f3 is a focal length of the third lens;
f4 is a focal length of the fourth lens;

f5 is a focal length of the fifth lens; and fs is a focal length of the varifocal optical system in a short focus state.

6. The varifocal optical system as described in claim 1, wherein the varifocal optical system satisfies following conditional expression:

$$T4>2 \text{ mm};$$

wherein T4 is an axial distance from an image-side surface of the triple prism to an object-side surface of the second lens when in a long focus state.

7. The varifocal optical system as described in claim 1, further comprising:

a diaphragm;

wherein the diaphragm is located between the second lens and the third lens, and the varifocal optical system satisfies following conditional expressions:

$$T6>1.5 \text{ mm; and}$$

$$T7>1.5 \text{ mm};$$

wherein T6 is an axial distance from an image-side surface of the second lens to the diaphragm; and T7 is an axial distance from the diaphragm to an object-side surface of the third lens.

8. The varifocal optical system as described in claim 1, wherein an object-side surface and an image-side surface of the first lens, and an object-side surface and an image-side surface of the fourth lens are spherical surfaces; an object-side surface and an image-side surface of the second lens, an object-side surface and an image-side surface of the third lens, and an object-side surface and an image-side surface of the fifth lens are aspheric surfaces.

* * * * *